United States Patent
Wu et al.

(12)

(10) Patent No.: US 6,610,123 B2
(45) Date of Patent: Aug. 26, 2003

(54) FILTERED MASK ENCLOSURE

(75) Inventors: Han-Ming Wu, Shanghai (CN); Giang Dao, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/025,258

(22) Filed: Dec. 17, 2001

(65) Prior Publication Data

US 2003/0110944 A1 Jun. 19, 2003

(51) Int. Cl.[7] ............................................. B03C 3/011
(52) U.S. Cl. ........................ 95/69; 55/385.6; 55/485; 55/486; 96/57; 96/64; 96/74; 118/63; 438/759; 438/905; 438/906
(58) Field of Search ........................ 96/57–59, 66, 96/64, 74; 95/69, 78; 55/385.6, 485, 486; 438/759, 905, 906; 118/63

(56) References Cited

U.S. PATENT DOCUMENTS

| | | | | |
|---|---|---|---|---|
| 2,735,964 A | * | 2/1956 | Grieve et al. | 361/814 |
| 3,172,747 A | * | 3/1965 | Nodolf | 96/151 |
| 3,804,942 A | * | 4/1974 | Kato et al. | 423/239.1 |
| 3,988,131 A | * | 10/1976 | Kanazawa et al. | 96/58 |
| 4,354,858 A | * | 10/1982 | Kumar et al. | 95/78 |
| 4,471,395 A | * | 9/1984 | Beck et al. | 360/98.04 |
| 4,597,781 A | * | 7/1986 | Spector | 96/52 |
| 4,684,510 A | * | 8/1987 | Harkins | 423/210 |
| 4,902,316 A | * | 2/1990 | Giles et al. | 96/58 |
| 5,055,115 A | * | 10/1991 | Yikai et al. | 96/59 |
| 5,123,936 A | * | 6/1992 | Stone et al. | 95/65 |
| 6,042,637 A | * | 3/2000 | Weinberg | 96/58 |
| 6,242,347 B1 | * | 6/2001 | Vasudev et al. | 438/680 |
| 6,395,073 B1 | * | 5/2002 | Dauber | 96/134 |
| 6,428,611 B1 | * | 8/2002 | Andolino et al. | 96/25 |
| 6,450,117 B1 | * | 9/2002 | Murugesh et al. | 118/723 ME |
| 6,472,326 B1 | * | 10/2002 | Holbrook et al. | 438/704 |

* cited by examiner

Primary Examiner—Richard L. Chiesa
(74) Attorney, Agent, or Firm—George Chen

(57) ABSTRACT

The present invention includes a filtered mask enclosure having an exterior portion and interior regions within the exterior portion such that the interior regions have a filtering region and a purging region connected to the filtering region. The present invention further includes a method of removing a first contaminant in a gas phase, a second contaminant in a solid phase, and a third contaminant having an electrical charge from a purge gas and flowing the purge gas through a vicinity of a mask while exposing a wafer with light through the mask.

7 Claims, 3 Drawing Sheets

FILTERED MASK ENCLOSURE

BACKGROUND OF THE INVENTION

1. Field of the Invention

The present invention relates to the field of semiconductor integrated circuit (IC) manufacturing, and more specifically, to an apparatus for and a method of removing contaminants from a mask during photolithography.

2. Discussion of Related Art

The manufacturing of IC devices involves the sequential processing of a semiconductor wafer to add or remove various layers of material. The critical layers define features in the IC design having tighter groundrules, such as those for isolation, gate, contact, and first metal while the non-critical layers define the remaining features.

Photolithography is a process of patterning each layer on the wafer. As many as 35 masks may be required to pattern all of the layers on the wafer. A mask is fabricated by depositing an opaque material, such as chrome, on a transparent or reflective substrate and then etching the chrome to form features that are 5 times larger than the desired size on the wafer.

The wafer is covered with a material called photoresist that is sensitive to light. An exposure tool, such as a stepper, shines light of a nominal wavelength and bandwidth onto the mask and optically reduces the features 5 times so as to print a latent image with the correct dimensions in the photoresist on the wafer. The photoresist is developed to create openings corresponding to the location and intensity of light exposure. Thus, the photoresist serves as a stencil for transferring the pattern, originally in the mask, into the wafer by etching or ion implanting the underlying layers through the openings.

When the minimum critical dimension (CD) of a feature on a mask becomes smaller than the exposure wavelength, the resolution of an image of the feature may be degraded by diffraction or spreading of the exposure light. A phase-shifting mask (PSM) is a type of mask that modulates the phase as well as the amplitude of the exposure light to minimize the detrimental effects of diffraction. Furthermore, optical proximity correction (OPC) may be incorporated into the mask to compensate for systematic image distortion resulting from printing or etching. The distortions may include corner rounding, line shortening, and CD offset between nested features and isolated features.

A mask, including a PSM having OPC, must be kept clean of contamination in order to ensure fidelity of the pattern transfer. A mask is kept clean by covering it with a thin and transparent material or pellicle. However, when the wavelength of the light used for exposure becomes shorter than about 180 nanometers (nm), the vicinity of the mask must be purged to keep away any contaminant that may absorb light at the exposure wavelength.

Thus, what is needed is an apparatus for and a method of keeping contaminants away from a mask during exposure in a stepper.

DETAILED DESCRIPTION OF THE PRESENT INVENTION

In the following description, numerous particular details, such as specific materials, dimensions, and processes, are set forth in order to provide a thorough understanding of the present invention. However, one skilled in the art will realize that the invention may be practiced without these particular details. In other instances, well-known semiconductor equipment and processes have not been described in particular detail so as to avoid obscuring the present invention.

The present invention comprises an apparatus for and a method of keeping contamination away from a mask during exposure of a wafer with light in a stepper. The light path in the stepper must be kept clean of contamination in order to ensure fidelity of the pattern transfer from the mask to the photoresist coated on the wafer. In particular, when the wavelength of the exposure light used in photolithography becomes shorter than about 180 nanometers (nm), the vicinity of the mask must be purged to keep away any contaminant that may absorb light at the exposure wavelength.

Figure 1:
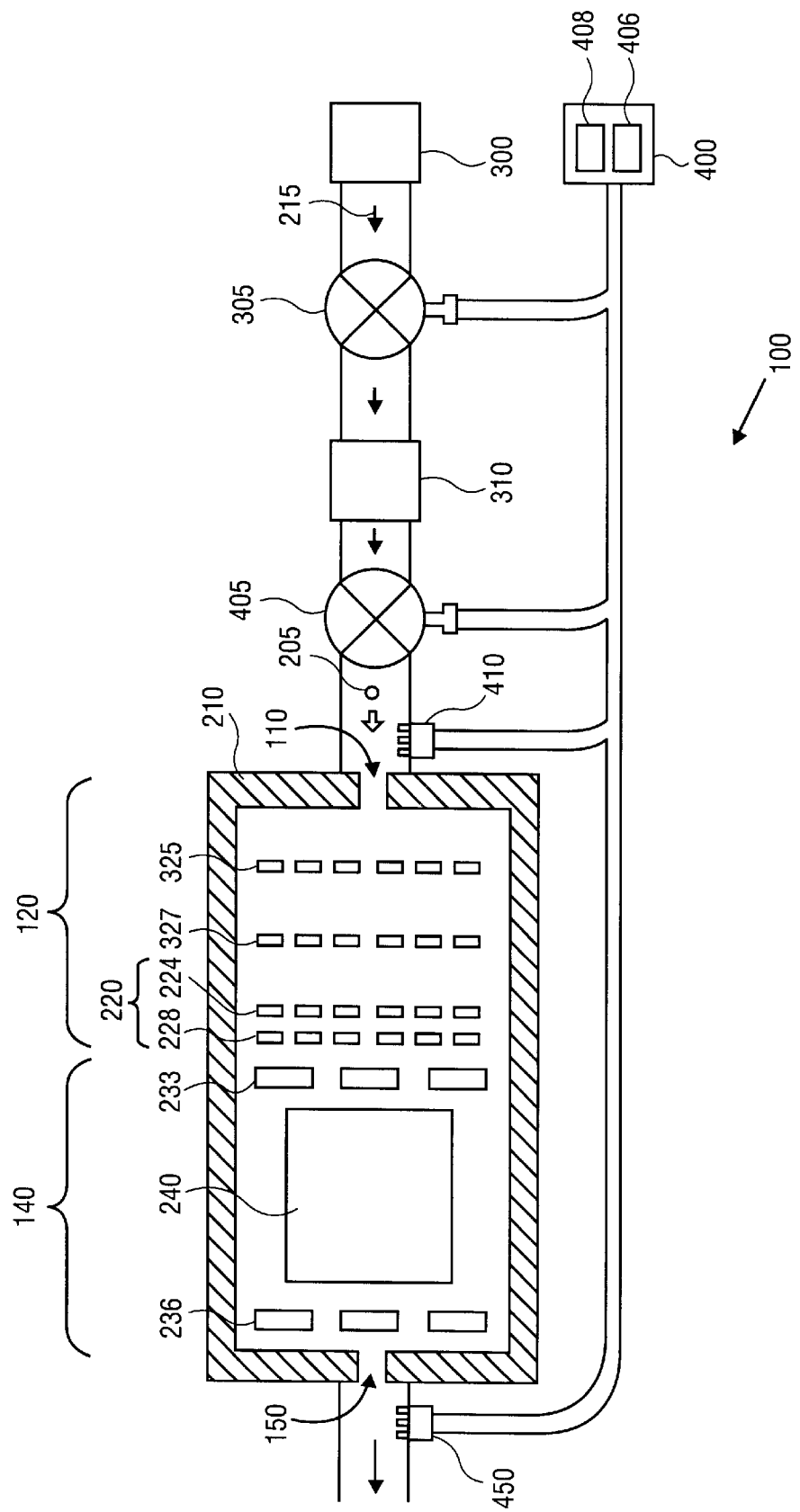
FIG. 1 is an illustration of a plane view of an embodiment of a filtered mask enclosure according to the present invention.

Some embodiments of the apparatus claimed in the present invention will be described first. A filtered mask enclosure 100 has an exterior portion 210. A plane view of an embodiment of the filtered mask enclosure 100 is shown in FIG. 1. In one embodiment, the exterior portion 210 of the filtered mask enclosure 100 is electrically conductive and grounded. A conductive surface typically has a resistance of less than 1.0E3 Ohms. In another embodiment, the exterior portion 210 is insulative and in an uncharged or neutral state. An insulative surface typically has a resistance of more than 1.0E11 Ohms. The filtered mask enclosure 100 also has one or more interior regions, such as a filtering region 120 and a purging region 140.

Figure 2:
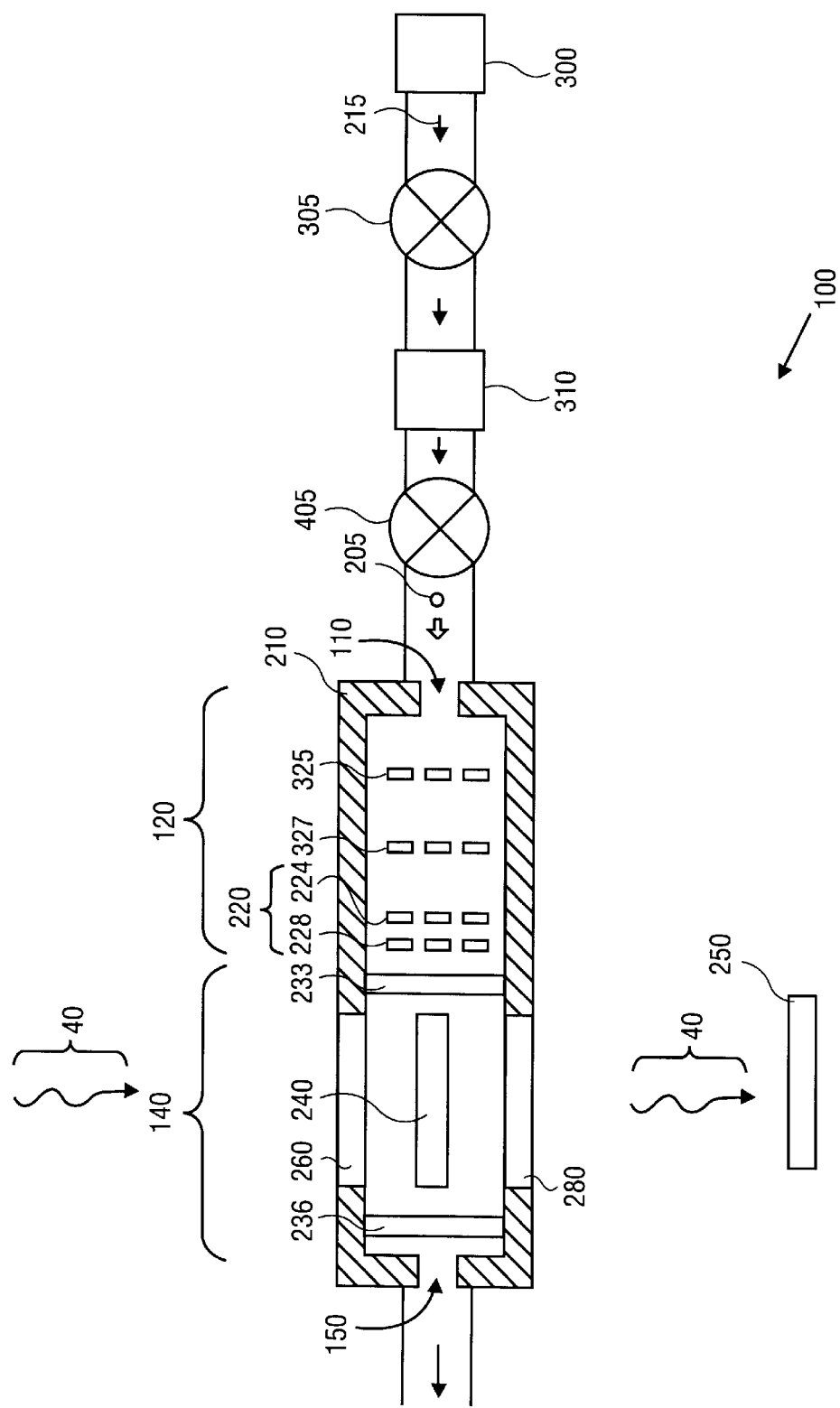
FIG. 2 is an illustration of an elevation view of an embodiment of a filtered mask enclosure according to the present invention.

A purge gas 215 may be used to displace ambient air in the interior regions of the filtered mask enclosure 100. The purge gas 215 must not absorb light 40 transmitted through the mask 240 during exposure of a wafer 250 in a stepper. An elevation view of an embodiment is shown in FIG. 2. For light 40 with a wavelength of 365 nm, 248 nm, or 193 nm, Clean Dry Air (CDA) may be used as a purge gas 215. However, for light 40 with a wavelength shorter than about 180 nm, CDA will absorb a significant amount of light 40, thus reducing the flux available for exposure of the mask 240. Consequently, for light 40 with a wavelength of 157 nm or 126 nm, a gas that does not absorb light at the shorter exposure wavelength, such as Helium or Nitrogen, should be selected for the purge gas 215.

Preconditioning of the purge gas 215 to adjust critical parameters may occur at a source 300 or at a Point-of-Use (POU) 310. The source 300 may be a stand-alone storage cylinder or a bulk delivery system. Bulk delivery minimizes cylinder changeouts. The elimination of frequent cylinder changes minimizes the introduction of a contaminant 205. Critical parameters that are usually monitored and controlled include flow rate, differential pressure, temperature, water (moisture) level, relative humidity, and Oxygen level. Sensors and actuators for the critical parameters may be arranged as a set of inlet components 410 and a set of outlet components 450 connected to a control unit 400. The control unit 400 may include a computer 408. The control unit 400 may also include a communication device 406 for interacting with the stepper or a network.

An initial pressure of the purge gas 215, such as 1.3E5–1.3E7 Pascals, is reduced with a pressure regulator 305 to a level that will not damage the filtered mask enclosure 100, the filters 325, 327, 220, the mask 240, or the pellicles 260, 280. The temperature set point is usually chosen to be the same as the ambient temperature in the vicinity of the mask 240 in the stepper. The temperature of the purge gas 215 is controlled to +/−0.2 degree Centigrade.

A mass flow controller (MFC) 405 adjusts the flow rate of the incoming purge gas 215. The MFC may be analog. Alternatively, the MFC may be digital and include a Digital Signal Processor (DSP). The operating range is about 10:1 for an analog MFC and about 100:1 for a digital MFC. Furthermore, a digital MFC, unlike an analog MFC, may be tuned and calibrated for several different gases. A digital MFC is also capable of enhanced diagnostics, including self-diagnostics.

After preconditioning, the purge gas 215 enters the filtered substrate enclosure 100 through an inlet 110. The filtering region 120 may include one or more filters, such as a gas purifier 325, a particulate filter 327, and an electrostatic filter 220. The electrostatic filter 220 may include a first shield 224 and a second shield 228. As needed, the filtered mask enclosure 100 may include additional loops for recirculation of the purge gas 215 through one or more of the filters.

A purifier medium for the gas purifier 325 is highly selective for a specific gas-phase contaminant 205 so the appropriate purifier medium should be carefully selected. Several types of purifier medium are available.

A first type of purifier medium is an ion exchange medium. For example, a pleated membrane coated with a polymer, such as an ion exchange resin, will bind alkaline contaminants such as ammonia and some amines.

A second type of purifier medium is a catalytic medium. A catalytic medium will lower the activation energy required for the desired chemical reaction to occur. For example, Manganese Oxide will convert Ozone molecules to Oxygen molecules.

A third type of purifier medium is an adsorptive medium. For example, the adsorptive medium may be a carbon- or zeolite-based structure that is porous and impregnated with a chemical. The adsorptive medium operates through two different mechanisms. Physisorption occurs when van der Waal's forces attract and trap a gas-phase contaminant on the large surface area within the pores. Condensables and organics may be removed by physisorption. Chemisorption occurs when the impregnated chemical reacts with a passing gas-phase contaminant and binds it to the surface. Acids or bases may be removed by chemisorption.

A particulate filter medium for the particulate filter 327 may be formed from ceramic, metal, polymer, or other suitable material. A Fluorohydrocarbon membrane is an example of a polymer filter. In one embodiment, the concentration of particles larger than 50.0 nm in the purge gas 215 after filtration, is less than 2 particles per standard liter. In another embodiment, the concentration of particles larger than 10.0 nm in the purge gas 215 is less than 0.010 particles per standard liter. In still another embodiment, a particulate filter 327 removes particles larger than 3.0 nm in the purge gas 215.

The electrostatic filter 220 may have a first shield 224 and a second shield 228. The first shield 224 is located within the filtering region 120 and electrically isolated from the exterior portion 210. The first shield 224 is at a first charged state relative to ground. The second shield 228 is also located within the filtering region 120 and electrically isolated from the exterior portion 210. The second shield 228 is at a second charged state relative to ground.

The first charged state and the second charged state have opposite polarity. In one embodiment, the first charged state is positive while the second charged state is negative. The first charged state and the second charged state usually have the same magnitude.

In a first embodiment, the first shield 224 and the second shield 228 are not electrically conductive. However, the first shield 224 and the second shield 228 have opposite polarity. Each shield is a matrix of material possessing a molecular structure with electrostatically charged groups or moieties attached towards the outside of the structure. The material is intrinsically charged so a power supply or battery is not needed.

In a second embodiment, the first shield 224 and the second shield 228 are electrically conductive and charged to opposite polarity by a power supply or a battery. The shields are electrically isolated from each other. Each shield may be charged through capacitors and discharged through resistors as needed. In one embodiment, the magnitude of the potential of each shield is about 1.0E3–5.0E4 Volts. In another embodiment, the potential is about +50.0 Volts on one shield and −50.0 Volts on the other shield.

In a third embodiment, the first charged state and the second charged state reverse polarity as a function of time. In a fourth embodiment, the first charged state and the second charged state retain their polarity but change their magnitude as a function of time. The changes in polarity or magnitude of the first shield 224 and the second shield 228 are usually synchronized.

The purge gas 215 flows past the first shield 224 and the second shield 228 of the electrostatic filter 220. In one embodiment, the purge gas 215 flows perpendicularly to the first shield 224 and the second shield 228. Each shield is a porous grid in which the contact area may be changed by varying the number and size of the pores. The contact area may further be enlarged by using stacked or sequential porous grids that are separated by appropriate spacings or gaps. Each porous grid has a polarity opposite to the polarity of the next porous grid.

In another embodiment, the purge gas 215 flows parallel to the first shield 224 and the second shield 228. The contact area of each shield may be enlarged by using longer or wider plates. The space occupied by the plates may be reduced by using nested or folded plates. In one embodiment, the plates are separated by a gap of about 1 millimeter (mm).

Access panels and mechanisms may be included in the filtered mask enclosure 100 for replacing or cleaning each type of filter. For example, a gas purifier 325 may be removed so as to regenerate the purifier medium. A particulate filter 327 may be removed so as to back flush the filter medium. An electrostatic filter 220 may be removed so as to clean the shields 224, 228.

After flowing through the filtering region 120, the purge gas 215 flows through the purging region 140 before exiting the filtered mask enclosure 100 through an outlet 150. A mask 240 may be located within the purging region 140 between a first diffuser 233 and a second diffuser 236. Depending on the application, the diffusers 233, 236 are designed, shaped, and laid out to create either laminar or turbulent flow of the purge gas 215 around the mask 240. In most cases, purging of the mask region 140 is faster and more effective if pockets of dead space are minimized or eliminated. Dead space refers to a local area where the purge gas 215 may be stationary or flowing much slower than in the bulk or mainstream. In one embodiment, the flow of the purge gas 215 through the filtered mask enclosure 100 is laminar, with a flow rate between 0.2 and 3.0 liters per minute. In one embodiment, the Reynolds number is less than 2.0E5. An excessively high flow rate will generate static charges that may create extensive damage upon discharge.

In one embodiment, a mask 240 is placed into the purging region 140 prior to exposure of a wafer 250 in a stepper and removed after use. A mechanism may be used for aligning and placing the mask 240 accurately within the mask region 140. In another embodiment, the mask 240 is kept within the purging region 140 during storage as well as during exposure. Various mechanisms may be used for holding the edges of the mask 240 securely within the mask region 140. Examples include pins, clamps, vacuum chucks, and electrostatic chucks.

Only one pellicle is usually needed to protect a reflective mask. However, two pellicles are usually used to protect a mask 240 that is transmissive. A transmissive mask 240 has two opposing, generally parallel, surfaces: one surface has features patterned in an absorber layer, such as an opaque layer of Chrome, while the other surface is unpatterned. One pellicle 260 is mounted to the exterior portion 210 of the filtered mask enclosure 100 facing the patterned side of the mask 240 in the purging region 140. An elevation view of an embodiment is shown in FIG. 2. Another pellicle 280 is mounted to the exterior portion 210 of the filtered mask enclosure 100 facing the unpatterned side of the mask 240 in the purging region 140. A pellicle-to-mask gap on the patterned side of the mask 240 is typically 5 mm. The pellicle-to-mask gap on the unpatterned side of the mask 240 is less critical and may be the same as or different from the pellicle-to-mask gap on the patterned side of the mask 240.

The pellicles 260, 280 for a transmissive mask 240 must possess sufficient mechanical strength and durability to withstand the absolute and differential pressures associated with the flow of the purge gas 215 through the filtered mask enclosure 100. The pellicles 260, 280 must also permit 85.0–99.0% transmission of the exposure light 40 with a transmission nonuniformity of less than 0.2%.

At an exposure wavelength of 248 nm or 193 nm, the pellicles 260, 280 may be organic membranes of linear or cyclic Fluorocarbon polymers. At an exposure wavelength of 157 nm, hard pellicles may be used. Hard pellicles may be low-OH content silica or Fluorine-doped fused silica. In general, hard pellicles of crystalline Fluorides, such as Calcium Fluoride and Magnesium Fluoride, may be used for light 40 with a wavelength below 180 nm. However, some unfavorable material properties, such as a large coefficient of thermal expansion and optical birefringence, must be addressed.

Some embodiments of a method to keep contaminants away from the vicinity of a mask during exposure with light as claimed in the present invention will be described next. A purge gas is allowed to flow around a mask to displace ambient air and keep away contaminants in the vicinity of a mask during exposure in a stepper. The purge gas must allow 85.0–99.0% transmission of the light used for exposure of the mask. For exposure light with a wavelength of 365 nm, 248 nm, or 193 nm, Clean Dry Air (CDA) may be used as a purge gas. However, for an exposure wavelength shorter than about 180 nm, CDA will absorb a significant amount of light, thus reducing the flux available for exposure of the mask. Consequently, for an exposure wavelength of 157 nm or 126 nm, a gas that does not absorb light at the shorter exposure wavelength, such as Helium or Nitrogen, must be used for the purge gas.

The flow of the purge gas around the mask may be either laminar or turbulent. In most cases, purging of the vicinity of the mask is faster and more effective if pockets of dead space are minimized or eliminated. Dead space refers to a local area where the purge gas may be stationary or flowing much slower than in the bulk or mainstream. In one embodiment, the flow rate of the purge gas around the mask may be between 0.2 and 3.0 liters per minute. An excessively high flow rate may damage the filtered mask enclosure, the filters, the mask, or the pellicles. An excessively high flow rate may also generate an undesirable level of static charge that will create extensive damage upon discharge.

A contaminant to be kept away from the mask may be in a solid phase (particulate), a liquid phase, or a gaseous phase. The contaminant may be organic or inorganic, acidic or basic, molecular or elemental, and metallic or ionic. The contaminant may be electrically uncharged (neutral) or electrically charged.

For example, contaminants, such as Chlorine ions, Sodium ions, Copper ions, and Amine bases, must be kept away from the mask to avoid potential problems, such as corrosion of the mask or the stepper, degradation of photoresist in the lithography process, or change in the doping level, carrier mobility, and carrier lifetime of the wafer.

In particular, a contaminant that absorbs light at the exposure wavelength must be kept out of the path of the light exposing the wafer in a stepper. At an exposure wavelength below about 180 nm, optical contaminants include water, Oxygen, Carbon Dioxide, and a wide range of organic compounds, especially hydrocarbons. Optical contaminants must be reduced to a concentration of about 1 part per million (ppm) or less.

The concentration of optical contaminants, such as water (moisture), may be measured using Tunable Diode Laser Absorption Spectroscopy (TDLAS). Measurements are taken at a wavelength of light that is known to be strongly absorbed by the contaminant of interest. Calibration is based on Beer's Law.

Figure 3:
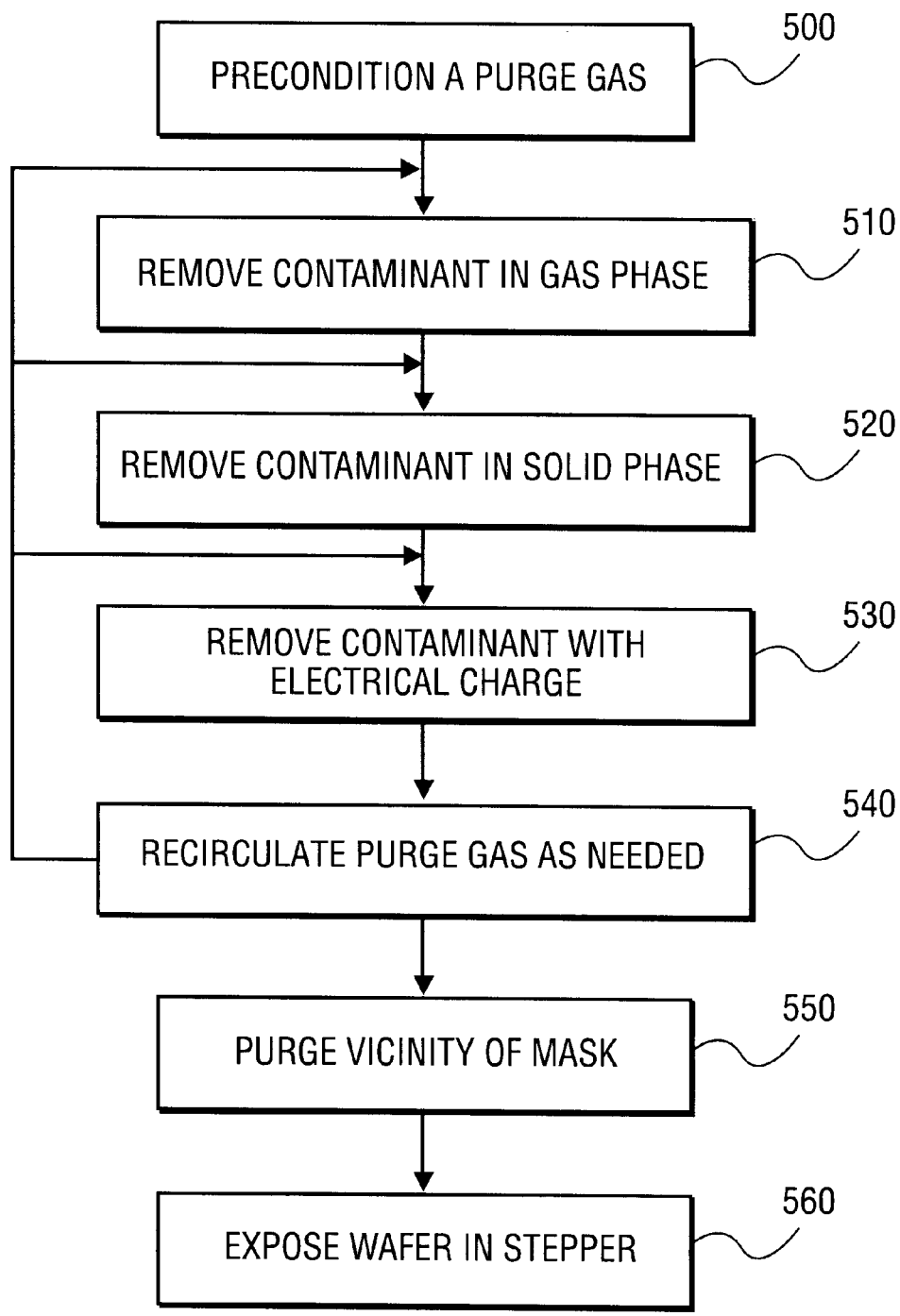
FIG. 3 is an illustration of an embodiment of a method of keeping contaminants away from a mask according to the present invention.

An embodiment of a method of keeping contaminants away from the vicinity of a mask during exposure of a wafer in a stepper is shown in FIG. 3 and described below. The order of the steps may vary, depending on which type of contaminant is predominant. In some cases, one or two of the filtration steps 510, 520, 530 may be skipped. In other cases, one or more of the filtration steps 510, 520, 530 may be performed more than once.

In a first step, preconditioning 500 adjusts the critical parameters of a purge gas. Critical parameters that are usually monitored and controlled include flow rate, differential pressure, temperature, water (moisture) level, relative humidity, and Oxygen level.

In a second step, gas purification 510 removes a contaminant in the gas phase with high selectivity. For example, alkaline contaminants, such as ammonia and some amines, may be removed. A gas-phase contaminant may be removed by several mechanisms, including ion exchange, catalytic conversion, and adsorption. Adsorption includes physisorption and chemisorption.

In a third step, particle filtration 520 removes a solid-phase, or particulate, contaminant larger than a certain size. In one embodiment, the concentration of particles larger than 50.0 nm is less than 2 particles per standard liter after filtration. In another embodiment, the concentration of particles larger than 10.0 nm is less than 0.010 particles per standard liter after filtration. In still another embodiment, particles larger than 3.0 nm are removed. Such small particles may be counted off-line with a Condensation Nucleus Counter (CNC). A smaller standard deviation for the counting measurement may be achieved by sampling a larger volume of the purge gas.

In a fourth step, electrostatic filtration 530 removes a contaminant that is electrically charged. A potential of 1.0E3–5.0E4 Volts may be used to attract and trap a contaminant. Polarity may be reversed and magnitude may be changed if needed. In one embodiment, a negatively-charged contaminant is removed before a positively-charged contaminant. The deposition velocity of the contaminant depends on contaminant size, contaminant shape, contaminant charge, and electric field strength. The number of actual contaminants deposited depends on the contaminant concentration and the length of the exposure time.

In another embodiment, a charge is induced on a contaminant that is initially uncharged or neutral so that it can be subsequently removed. A charge may be induced by allowing the purge gas to flow through one or more electric fields. An electric field may be generated by a power supply or a battery. For example, the purge gas may flow through a first electric field maintained at a first charge and then flow though a second electric field maintained at a second charge. The first charge and the second charge are of opposite polarity. Depending on the orientation of the mask in the stepper, the purge gas may flow parallel to the electric field or perpendicular to the electric field. In one embodiment, the electric field strength may be 6.0–85.0 Volts per Centimeter. In another embodiment, the electric field may be about 1.0E3 Volts per Centimeter.

Contaminants may be removed by trapping them. Alternatively, contaminants may be transported away from the mask and released outside the path of the exposure light in a stepper. If desired, contaminants may be held during exposure in a stepper and subsequently released after exposure has been completed.

In a fifth step, the purge gas may be recirculated 540 through one or more of the filters to remove more of the contaminants and to increase the effective efficiency of the filtration.

In a sixth step, the vicinity of a mask is purged 550 by allowing the purge gas to flow around the mask.

In a seventh step, light is transmitted through the mask, while the purge gas is flowing, to expose 560 a wafer in the stepper.

Many alternative embodiments and numerous particular details have been set forth above in order to provide a thorough understanding of the present invention. One skilled in the art will appreciate that many of the features in one embodiment are equally applicable to other embodiments. One skilled in the art will also appreciate the ability to make various equivalent substitutions for those specific materials, processes, dimensions, concentrations, etc. described herein. It is to be understood that the detailed description of the present invention should be taken as illustrative and not limiting, wherein the scope of the present invention should be determined by the claims that follow.

Thus, we have described an apparatus for and a method of removing contamination from a mask used in photolithography.

We claim:

1. A method comprising:

preconditioning a purge gas, said purge gas comprising:
    a first contaminant, said first contaminant being in a gas phase,
    a second contaminant, said second contaminant being in a solid phase, and
    a third contaminant, said third contaminant having an electrical charge;

removing said first contaminant from said purge gas;

removing said second contaminant from said purge gas;

removing said third contaminant from said purge gas;

flowing said purge gas through a vicinity of a mask; and exposing a wafer with light through said mask.

2. The method of claim 1 wherein said first contaminant is removed with a gas purifier.

3. The method of claim 2 wherein said second contaminant is removed with a particulate filter.

4. The method of claim 3 wherein said third contaminant is removed with an electrostatic filter.

5. The method of claim 1 wherein said purge gas is Helium.

6. The method of claim 1 wherein said purge gas is Nitrogen.

7. The method of claim 1 further comprising recirculating said purge gas.

\* \* \* \* \*